Feb. 22, 1944.    G. V. JAKEWAY ET AL    2,342,401
DOOR HANDLE
Filed May 26, 1941
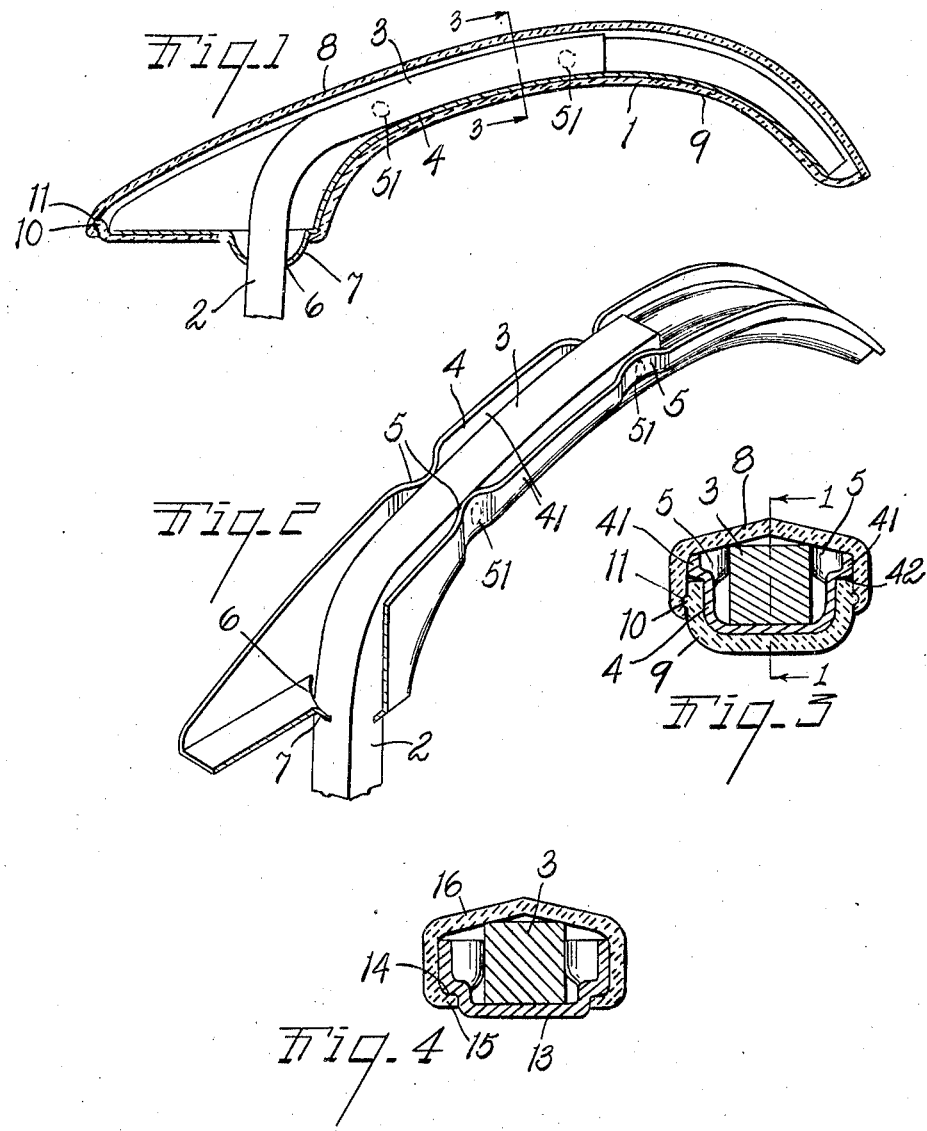
INVENTORS.
Gerald V. Jakeway
Isaac S. Keeler
BY Earl F. Chappell
ATTORNEYS.

Patented Feb. 22, 1944

2,342,401

UNITED STATES PATENT OFFICE 2,342,401

DOOR HANDLE

Gerald V. Jakeway and Isaac S. Keeler, Grand Rapids, Mich., assignors to Keeler Brass Company, Grand Rapids, Mich.

Application May 26, 1941, Serial No. 395,126

9 Claims. (Cl. 292—347)

This invention relates to improvements in door handle.

The main objects of this invention are:

First, to provide an improved handle such as for automobile doors, remote controls for automobiles and the like which is very attractive in appearance, the exposed external parts of which are of plastic.

Second, to provide a handle or the like of this character which is simple and economical in its parts and in the assembly thereof, and at the same time very strong and durable.

Third, to provide a structure having the advantages stated in which the parts are simple and economical and very easily assembled.

Objects pertaining to details and economies of the invention will definitely appear from the description to follow. The invention is defined in the claims.

A structure embodying the features of our invention is clearly illustrated in the accompanying drawing, in which:

Fig. 1 is a fragmentary view partially in longitudinal section on a line corresponding to line 1—1 of Fig. 3 of an automobile door handle embodying the features of our invention.

Fig. 2 is a fragmentary perspective view partially in section of the spindle and handle bar or body portions of our improved handle.

Fig. 3 is an enlarged cross section on line 3—3 of Fig. 1.

Fig. 4 is a cross section of a modified form or embodiment of our invention sectioned as in Fig. 3.

In the embodiment of the invention illustrated the reference numeral 1 in general designates the handle, the structure illustrated being designed as an automobile door handle. We provide a spindle or chill 2 having a laterally disposed curved arm 3 which is embraced by the channel body member or handle bar 4, which is suitably longitudinally curved and provided with insets 5 in the side walls thereof secured to the arm of the spindle 3 by means of spot welding as indicated at 51. The body member has an opening 6 formed in a spherically drawn portion 7 thereof adapted to engage the coacting escutcheon, not illustrated.

The handle bar or body member 4 is provided with lateral offsets 41 adjacent its edges providing rearwardly facing shoulders 42, see Fig. 3. The outer casing member 8 is formed of a suitable moldable plastic material, Tenite having been found very satisfactory, although there are other plastics which might be employed. These can be had in various colors and can be made in various designs. No attempt has been made to illustrate a particularly ornamental design or configuration. This casing member 8 is of channel section and is adapted to telescopingly embrace the outwardly offset portions of the metal body member and also to telescopingly engage the sides of the reversely positioned channel shaped inner casing member 9 which is also formed of plastic. The inner casing member is provided with an external rib 10 on its side walls while the outer casing member has an internal groove 11 adapted for snap-on engagement with the rib 10, the sides of the outer casing member being springable to permit this engagement.

Preferably, an autogenously fused connection or joint is provided between the inner and outer casing members, this being secured by applying a solvent to the meeting surfaces before the parts are snapped or sprung together in assembled relation. This snap-on interlocking engagement holds the parts in position while the fusing or adhering action is taking place so that it is not necessary to provide clamps for this purpose. This is of great advantage in manufacture as the time in applying and the necessity for providing numerous clamps and removing them is avoided.

In the embodiment shown in Fig. 4 the inner plastic casing member 9 is omitted, the metal body member 13 being provided with a shoulder 14 adjacent the bottom or web thereof. The inturned rib portion 15 of the outer casing member 16, formed of plastic material, is springably engageable with the shoulder 14. This for some uses might require finish of the bottom portion of the metal member 13, but as it is on the inner side it is not particularly in evidence. However, the preferred embodiment is considered much more practical and desirable.

Handles embodying this invention are very attractive in appearance and are inexpensive in the matter of parts in assembling. The use of ornamental metal parts, plating steps, and the like are eliminated, and a saving is accomplished of certain metals which are now in increasing demand.

No attempt has been made to illustrate various other adaptations of the invention as it is believed the disclosure made will enable those skilled in the art to adapt the invention as may be desired. It should be understood that the foregoing terminology is used descriptively rather than in a limiting sense, and with the full intention to include equivalents of the features shown and described within the scope of the following claims.

Having thus described the invention what is claimed as new and desired to secure by Letters Patent is:

1. In a hardware article, the combination of a spindle provided at its outer end with a laterally disposed curved arm, a curved sheet metal body member of channel section embracing said arm and having insets at the sides thereof welded to the sides of said arm, said body member having laterally offset edge portions providing rearwardly facing shoulders, an inner casing member of plastic material of channel cross section embracing said body member with its edges in abutting relation to said offsets and provided with longitudinally disposed ribs on the sides thereof, and an outer casing member of plastic material of channel cross section nestingly embracing said body member and the sides of said inner casing member and having internal grooves coengaging with said ribs on said inner casing member, said outer casing member being springable to permit springing snap-on engagement of the outer casing member with the inner casing member.

2. In a hardware article, the combination of a spindle provided at its outer end with a laterally disposed arm, a sheet metal body member embracing said arm and welded thereto, an inner casing member of plastic material of channel cross section embracing said body member and provided with ribs on the sides thereof, and an outer casing member of plastic material of channel cross section nestingly embracing said body member and the side of said inner casing member and having internal grooves coengaging with said ribs on said inner casing member, one of said casing members being springable to permit springing snap-on engagement of the outer casing member with the inner casing member, nesting portions of said inner and outer casing members having an autogenous connection therebetween to fixedly secure said casing members against springing disengagement.

3. In a hardware article, the combination of a spindle provided at its outer end with a laterally disposed arm, a sheet metal body member embracing said arm and welded thereto, an inner casing member of plastic material of channel cross section embracing said body member and provided with ribs on the sides thereof, and an outer casing member of plastic material of channel cross section nestingly embracing said body member and the side of said inner casing member and having internal grooves co-engaging with said ribs on said inner casing member, one of said casing members being springable to permit springing snap-on engagement of the outer casing member with the inner casing member.

4. In a handle, the combination of an elongated body member curved lengthwise thereof and of channel section, a spindle member having an arm curved lengthwise thereof and positioned internally of the channel of said body member and fixedly secured thereto, a casing member of plastic material with the channel section nestingly engageable with said body member on one side thereof, and a second casing member of plastic material associated with the other side of said body member and acting with said first casing member to encase said body member, said casing members being provided with coacting interlocking rib and groove portions springably engageable in the assembly of the parts.

5. In a handle, the combination of a body member of hollow section, a spindle member having an arm positioned internally of said body member and fixedly secured thereto, a casing member of plastic material with the channel section nestingly engageable with said body member on one side thereof, and a second casing member of plastic material associated with the other side of said body member and acting with said first casing member to encase said body member, said casing members being provided with coacting interlocking rib and groove portions springably engageable in the assembly of the parts.

6. In a hardware article, a metal body member of hollow section, a member positioned internally of said body member and adapted to be connected to an operated device, and coacting premolded casing members nestingly associated with each other and with said body member, said casing members being provided with co-engaging internal and external interlocking means having snap engagement in said nesting relation thereof, said members being further connected by internal autogenous portions.

7. In a door operating handle, a metal body member of hollow section, a member positioned internally of said section and adapted to be connected to an operated device, and coacting premolded plastic casing members of generally U section nestingly associated with said body member and one another to encase the body member, said members being provided with internal and external rib and groove means having snap engagement in said nesting relation thereof to prevent inadvertent displacement from said relation.

8. In a door operating handle, a metal body member, and coacting premolded plastic casing members of generally U section nestingly associated with said body member and one another to encase the body member in laterally supported engagement therewith, said casing members being provided with coacting internal and external rib and groove means having snap engagement in said nesting relation thereof to prevent inadvertent displacement from said relation.

9. In a door operating handle, a metal body member, and coacting premolded plastic casing members nestingly associated with one another to encase the body member, at least one of said casing members being in laterally supported engagement with the body member, said casing members being provided with coacting internal and external rib and groove means having snap engagement in said nesting relation thereof to prevent inadvertent displacement from said relation.

GERALD V. JAKEWAY.
ISAAC S. KEELER.